United States Patent
Gao et al.

(10) Patent No.: US 12,199,478 B2
(45) Date of Patent: Jan. 14, 2025

(54) COIL OF ELECTRICAL MACHINERY AND METHOD FOR FORMING THE SAME, STATOR OF ELECTRICAL MACHINERY AND METHOD FOR FORMING THE SAME, AND ELECTRICAL MACHINERY

(71) Applicant: BEIJING GOLDWIND SCIENCE & CREATION WINDPOWER EQUIPMENT CO., LTD., Beijing (CN)

(72) Inventors: Yazhou Gao, Beijing (CN); Haitao He, Beijing (CN); Jing Xia, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 318 days.

(21) Appl. No.: 17/998,184

(22) PCT Filed: Sep. 11, 2020

(86) PCT No.: PCT/CN2020/114885
§ 371 (c)(1),
(2) Date: Nov. 8, 2022

(87) PCT Pub. No.: WO2022/000790
PCT Pub. Date: Jan. 6, 2022

(65) Prior Publication Data
US 2023/0261558 A1 Aug. 17, 2023

(30) Foreign Application Priority Data
Jun. 30, 2020 (CN) .......................... 202010611208.2

(51) Int. Cl.
*H02K 15/04* (2006.01)
*H02K 1/16* (2006.01)
*H02K 3/12* (2006.01)

(52) U.S. Cl.
CPC .......... *H02K 15/0435* (2013.01); *H02K 1/16* (2013.01); *H02K 3/12* (2013.01)

(58) Field of Classification Search
CPC ......... H02K 15/0435; H02K 1/16; H02K 3/12
(Continued)

(56) References Cited

U.S. PATENT DOCUMENTS 3,781,739 A    12/1973   Meyer
2016/0105061 A1*   4/2016   Horisaka .................. H02K 3/02
                                                                                           310/195
(Continued)

FOREIGN PATENT DOCUMENTS

CN    103208874 B    4/2015
CN    105229899 A    1/2016
(Continued)

OTHER PUBLICATIONS

Office Action from Chile: dated Apr. 1, 2024; Appln. No. 202203373.
(Continued)

*Primary Examiner* — Terrance L Kenerly
*Assistant Examiner* — Theodore L Perkins
(74) *Attorney, Agent, or Firm* — Frank Gao, Esq.

(57) ABSTRACT

The application discloses coils of an electrical machinery and a method for forming the coil, a stator of an electrical machinery and a method for forming the stator, and an electrical machinery. The method includes: providing a first conductor and a second conductor, a resistivity of the second conductor being lower than a resistivity of the first conductor; obtaining a rated current rising coefficient according to a desired power of the electrical machinery, the rated current
(Continued)

rising coefficient being a ratio of a rated current of the electrical machinery with the desired power to a rated current of a reference electrical machinery; obtaining, according to the rated current rising coefficient, a first conductor turn number of the first conductor and a second conductor turn number of the second conductor in each coil; forming the coil according to the first conductor turn number and the second conductor turn number.

16 Claims, 7 Drawing Sheets

(58) Field of Classification Search
USPC .......................................................... 310/208
See application file for complete search history.

(56) References Cited

U.S. PATENT DOCUMENTS

| 2018/0294090 A1 | 10/2018 | Nishikawa et al. |
| 2019/0229572 A1 | 7/2019 | Ziems et al. |

FOREIGN PATENT DOCUMENTS

| CN | 106787335 A | 5/2017 |
| CN | 108736600 A | 11/2018 |
| CN | 106416003 B | 1/2019 |
| CN | 109155543 A | 1/2019 |
| CN | 208461552 U | 2/2019 |
| CN | 109450120 A | 3/2019 |
| GB | 2493827 A | 2/2013 |
| JP | 2004153874 A | 5/2004 |
| JP | 2005278373 A | 10/2005 |
| JP | 2010183741 A | 8/2010 |
| JP | 2015211603 A | 11/2015 |
| WO | 2019163021 A1 | 8/2019 |
| WO | 2020073405 A1 | 4/2020 |

OTHER PUBLICATIONS

The Extended European Search Report dated Aug. 10, 2023; Appln. No. 20942862.2.

The First Indian Office Action dated Mar. 9, 2023; Appln. No. 202217062892.

The First Chinese Office Action dated Jun. 28, 2022; Appln. No. 202010611208.2.

The International Search Report mailed Mar. 29, 2021; PCT/CN2020/114885.

* cited by examiner

COIL OF ELECTRICAL MACHINERY AND METHOD FOR FORMING THE SAME, STATOR OF ELECTRICAL MACHINERY AND METHOD FOR FORMING THE SAME, AND ELECTRICAL MACHINERY

CROSS-REFERENCE TO RELATED APPLICATIONS

This application is a National Stage of International Application No. PCT/CN2020/114885, filed on Sep. 11, 2020, which claims priority to Chinese Patent Application No. 202010611208.2, filed on Jun. 30, 2020, both of which are hereby incorporated by reference in their entireties.

TECHNICAL FIELD

The present application relates to the field of wind turbine, and particularly relates to coils of an electrical machinery and a method for forming the coil, a stator of an electrical machinery and a method for forming the stator, and an electrical machinery.

BACKGROUND

Compared with other types of wind turbine, a direct-drive permanent magnet wind turbine removes the gearbox between the impeller and the electrical machinery, which has unique advantages in the system reliability and transmission efficiency. However, on the premise that a rated power of the electrical machinery is constant, a volume of the electrical machinery is inversely proportional to a rotation speed of the electrical machinery, and the rotation speed of the electrical machinery is the same as that of the impeller when the gearbox is removed, so that the volume of the direct-drive permanent magnet electrical machinery is much larger than volumes of other types of electrical machineries.

Since the direct-drive permanent magnet generator also plays the role of connecting the hub and the base in the system, when there is a demand for power-up in the system, it will bring about changes in the size of the electrical machinery itself and sizes of other large components of the system. Since most of these large components are made by casting, the redesign and capital investment of production molds are brought, which harms the economical efficiency.

Therefore, when the rated power of the electrical machinery changes, reducing the design and production cost of the electrical machinery is a technical problem expected to be solved.

SUMMARY

The present application provides coils of an electrical machinery and a method for forming the coil, so that the coil satisfying requirements can be obtained according to a desired power of the electrical machinery. The present application provides a stator of an electrical machinery and a method for forming the stator, and an electrical machinery, so that a stator of an electrical machinery with a desired power and the electrical machinery can be obtained at a lower cost.

In a first aspect, the present application provides a method for forming coils of an electrical machinery, including: providing a first conductor and a second conductor, a resistivity of the second conductor being lower than a resistivity of the first conductor; obtaining a rated current rising coefficient according to a desired power of the electrical machinery, the rated current rising coefficient being a ratio of a rated current of the electrical machinery with the desired power to a rated current of a reference electrical machinery, where a conductor of coils of the reference electrical machinery includes only the first conductor; obtaining, according to the rated current rising coefficient, a first conductor turn number of the first conductor and a second conductor turn number of the second conductor in each coil; forming the coil according to the first conductor turn number and the second conductor turn number.

According to the foregoing implementation of the first aspect of the present application, a total conductor turn number of the coil is a predetermined value.

According to any one of the foregoing implementations of the first aspect pf the present application, the obtaining, according to the rated current rising coefficient, a first conductor turn number of the first conductor and a second conductor turn number of the second conductor in the coil includes: obtaining a conductor turn number parameter according to the following formula:

$$N_0 = \frac{N_T(K-1)}{\sqrt{\frac{R_A}{R_B}} - 1},$$

where $N_0$ is the conductor turn number parameter, $N_T$ is the total conductor turn number, K is the rated current rising coefficient, $R_A$ is the resistivity of the first conductor, and $R_B$ is the resistivity of the second conductor; rounding the conductor turn number parameter to obtain the second conductor turn number; and subtracting the second conductor turn number from the total conductor turn number to obtain the first conductor turn number.

According to any one of the foregoing implementations of the first aspect of the present application, the predetermined value is an even number taken from 20 to 30.

According to any one of the foregoing implementations of the first aspect of the present application, the obtaining a rated current rising coefficient according to a desired power of the electrical machinery includes: establishing a first mapping model of a rated power of the electrical machinery to the rated current rising coefficient; obtaining the rated current rising coefficient according to the desired power of the electrical machinery and the first mapping model.

According to any one of the foregoing implementations of the first aspect of the present application, the establishing a first mapping model of a rated power of the electrical machinery to the rated current rising coefficient includes: establishing a second mapping model of the rated power of the electrical machinery to the rated current of the electrical machinery; obtaining the rated current of the reference electrical machinery; obtaining the first mapping model according to the second mapping model and the rated current of the reference electrical machinery.

According to any one of the foregoing implementations of the first aspect of the present application, the second mapping model includes:

$$P = mE_0 \times i_q + (X_d - X_q)i_d i_q - i^2 R_1,$$

where P is the rated power of the electrical machinery, m is a phase number of the electrical machinery, $E_0$ is a no-load back-electromotive force of the electrical machinery, i is the rated current, $i_q$ is a component of the rated current on a quadrature axis of the electrical machinery, $i_d$ is a component of the rated current on a direct axis of the electrical machinery, $X_d$ is a quadrature axis synchronous reactance of the electrical machinery, $X_q$ is a direct axis synchronous reactance of the electrical machinery, and $R_1$ is a stator resistance of the electrical machinery.

According to any one of the foregoing implementations of the first aspect of the present application, the first conductor is an aluminum conductor and the second conductor is a copper conductor.

According to any one of the foregoing implementations of the first aspect of the present application, the forming the coil according to the first conductor turn number and the second conductor turn number includes: forming first coil units and second coil units, where the first coil unit and the second coil unit each includes a first conductor ring and/or a second conductor ring with a preset turn number, a material of the first conductor ring is the same as a material of the first conductor, and a material of the second conductor ring is the same as a material of the second conductor ring, where in one of the first coil units and one of the second coil units, a total turn number of the first conductor ring is equal to the first conductor turn number, and a total turn number of the second conductor ring is equal to the second conductor turn number.

According to any one of the foregoing implementations of the first aspect of the present application, the forming the coil according to the first conductor turn number and the second conductor turn number includes: forming first coil units and second coil units, where the first coil unit and the second coil unit each includes a first conductor ring and/or a second conductor ring with a preset turn number, a material of the first conductor ring is the same as a material of the first conductor, and a material of the second conductor ring is the same as a material of the second conductor, where in one of the first coil units and one of the second coil units, a total turn number of the first conductor ring is equal to the first conductor turn number, and a total turn number of the second conductor ring is equal to the second conductor turn number.

In a second aspect, embodiments of the present application provide coils of an electrical machinery, the coil being formed according to the method according to any one of the foregoing implementations of the first aspect of the present application.

In a third aspect, embodiments of the present application provide a method for forming a stator of an electrical machinery, including: providing an iron core of the stator, the iron core including a plurality of tooth slots each for receiving coils; mounting the coil according any one of the foregoing implementations of the second aspect of the present application in the tooth slots.

In a fourth aspect, embodiments of the present application provide a stator of an electrical machinery including: an iron core including a body having a hollow cylindrical shape and a plurality of tooth slots arranged at intervals along a circumferential direction of the body; and a winding including a plurality of the coils according any one of the foregoing implementations of the second aspect of the present application arranged in a circumferential direction of the iron core, each of the coils being positioned in a corresponding tooth slot of the plurality of tooth slots.

According to the foregoing implementation of the fourth aspect of the present application, a total in-slot conductor turn number of a conductor received in each of the tooth slots of the iron core is a predetermined value, and the first conductor turn number of the first conductor in each of the tooth slots is a positive integer less than the total in-slot conductor turn number.

According to any one of the foregoing implementations of the fourth aspect of the present application, the iron core further includes a ventilation channel extending radially through the body.

In a fifth aspect, embodiments of the present application provide an electrical machinery including the stator according to any one of the foregoing implementations of the fourth aspect of the present application.

According to the coil of the electrical machinery and the method for forming the coil provided by embodiments of the present application, the rated current rising coefficient is obtained according to the desired power of the electrical machinery. The first conductor turn number of the first conductor and the second conductor turn number of the second conductor in each coil are obtained according to the rated current rising coefficient. Then, the coil is formed according to the first conductor turn number and the second conductor turn number in each coil, thereby obtaining the coil of the electrical machinery satisfying the desired power. By changing the first conductor turn number and the second conductor turn number, different desired powers of the electrical machinery can be achieved, where the adjustment of the rated power of the electrical machinery can be achieved without changing the sizes of the stator and other components of the electrical machinery that are matched to the stator. The cost of redesign of the stator and the large components that are matched to the stator can be saved. The coil and the stator of the electrical machinery with the desired power can be obtained at a lower cost. The economical efficiency for forming the coil, the stator and the electrical machinery can be improved.

According to the stator of electrical machinery and the method for forming the stator provided by embodiments of the present application, by adjusting the first conductor turn number of the first conductor and the second conductor turn number of the second conductor in the coil, the adjustment of the rated power of the electrical machinery including the stator can be achieved, and the expandability of the power of the electrical machinery can be improved without changing the size of the stator. By changing the first conductor turn number and the second conductor turn number in the coil, different desired powers of the electrical machinery can be achieved, where the adjustment of the rated power of the electrical machinery can be achieved without changing the sizes of the stator and other components of the electrical machinery that are matched to the stator. The cost of redesign of the stator and the large components that are matched to the stator can be saved. The coil and the stator of the electrical machinery with the desired power can be obtained at a lower cost. The economical efficiency for forming the stator and the electrical machinery can be improved.

BRIEF DESCRIPTION OF THE DRAWINGS

Features, objects and advantages of the present application will be clearer from the detailed description of following reference drawings of non-limited embodiments, where the same or similar reference numerals and/or letters mean the same or similar features.

DETAILED DESCRIPTION

Features and exemplary embodiments of various aspects of the present application will be described in detail below. In order to make the objects, technical solutions and advantages of the present application clearer, the present application is further described in detail below with reference to the drawings and specific embodiments. It should be understood that, specific embodiments described herein are only for the illustration of the present application, not for limiting the present application. For those skilled in the art, the present application can be implemented without some of these specific details. The following description of the embodiments is only for providing a better understanding of the present application by illustrating examples of the present application.

It should be noted that, herein, relational terms such as "first" and "second" are used only for distinguishing one entity or operation from another entity or operation, and do not necessarily require or imply any such actual relationship or order between these entities or operations. Moreover, the terms "comprising", "including", or any other variation thereof, are intended to encompass a non-exclusive inclusion, such that a process, a method, an article or a device including a series of elements not only includes these elements, but also includes other elements not explicitly listed, or includes elements inherent to the process, the method, the article or the device. Without further limitation, an element preceded by "including . . . " does not exclude presence of additional similar elements in a process, a method, an article or a device including the element.

Embodiments of the present application provide coils of an electrical machinery and a method for forming the coil, and a stator of an electrical machinery and a method for forming the stator. By the method for forming the coil, the coil can be formed according to a desired power of the electrical machinery. By the method forming the stator, the stator satisfying a power requirement can be formed on the basis of the formed coil.

Figure 1:
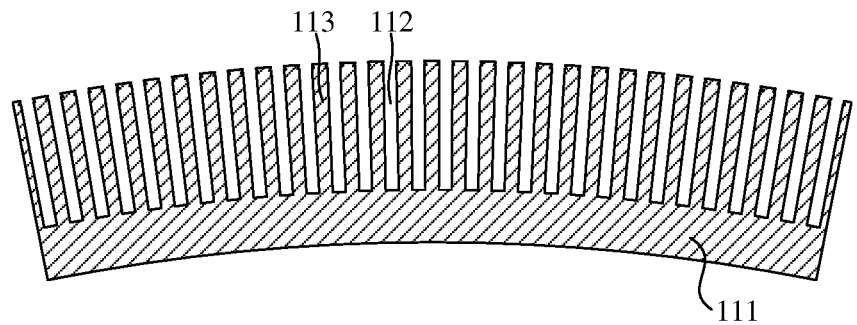
FIG. 1 is a schematic partial cross-sectional view of an iron core of a stator according to an embodiment of the present disclosure.

The method for forming the stator of the electrical machinery includes providing an iron core of the stator. FIG. 1 is a schematic partial cross-sectional view of an iron core of a stator according to an embodiment of the present disclosure. An iron core 110 includes a plurality of tooth slots 112. Each tooth slot 112 is configured to receive coils.

In some embodiments, the iron core 110 includes a body 111 having a hollow cylindrical shape, and a plurality of teeth 113 arranged at intervals along a circumferential direction of the body 111. Herein, the term "tooth slot" refers to a slot structure formed between every two adjacent teeth 113 along the circumferential direction of the body 111 of the iron core 110. Optionally, the tooth slots 112 are open slot structures, and each of the tooth slots 112 is a rectangular slot structure.

The body 111 of the iron core 110 has a hollow cylindrical shape and thus includes an outer circumferential surface and an inner circumferential surface. In embodiments relates to FIG. 1, the tooth slots 112 and the teeth 113 are arranged on the outer circumferential surface of the body 111. In this case, in an electrical machinery obtained by combining the stator including the iron core 110 and a rotor, at least a part of the structure of the rotor surrounds the outer circumferential side of the stator, that is, the electrical machinery is an outer rotor-inner stator electrical machinery. In some other embodiments, the tooth slots 112 and the teeth 113 may be arranged on the inner circumferential surface of the body 111. In this case, in an electrical machinery obtained by combining the stator including the iron core 110 and a rotor, at least a part of the structure of the stator surrounds the outer circumferential side of the rotor, that is, the electrical machinery is an inner rotor-outer stator electrical machinery.

In the step of providing the iron core of the stator, the electrical machinery, the stator of the electrical machinery and the iron core of the stator may be selected according to a desired power of the electrical machinery, thereby obtaining the iron core satisfying the demand. For a selected type of electrical machinery, a selected type of stator of the electrical machinery and a selected type of iron core of the stator, a plurality of design parameters of the electrical machinery accordingly have determined values. In the description below, one selected type of electrical machinery, one selected type of stator of the electrical machinery and one selected type of iron core of the stator will be taken as an example to facilitate explanation. It will be understood that, in actual practice, a plurality of parameters of the electrical machinery, the stator of the electrical machinery and the iron core of the stator may not be limited to the examples below, and the parameters can be adjusted according to actual design requirements.

For example, the stator of the electrical machinery further includes a winding. The winding includes a plurality of coil units (not shown) arranged along the circumferential direction of the iron core 110. The plurality of coil units are connected in parallel or in series into a predetermined structure, so as to form the winding. In the present embodiments, the winding is a double-layer distributed winding. That is, each coil unit is wound in two tooth slots 112 of the iron core 110 which are spaced apart by a predetermined pitch, and each coil unit includes two active sides connected to each other, where one active side of one coil unit and one active side of the other coil unit are received in each tooth slot 112.

For example, a pole-pair number p of the electrical machinery is 42, and a total slot number Q of the tooth slots 112 of the iron core 110 is 360. A preset pitch y in the winding is for example 4. A parallel branch number a of the electrical machinery is for example 3. A total conductor turn number $N_T$ of the coil (that is, a total in-slot conductor turn number of a conductor received in each tooth slot 112 of the iron core 110) is a predetermined value. In some embodiments, the predetermined value is an even number taken from 20 to 30.

For example, the total in-slot conductor turn number $N_T$ is 24. The winding is a double-layer distributed winding, so that the number of turns of a second coil of each coil is 12.

In the electrical machinery, the pole-pair number p of the electrical machinery, the total slot number Q of the tooth slots of the stator, the parallel branch number a of the winding, and the preset pitch y in the winding are related as follows:

a minimum electrical-unit slot number of the electrical machinery Q1=Q÷GCD (2p, Q)=360÷GCD (84, 360)=30, where GCD is a greatest common divisor calculator, and GCD (2p, Q) is to calculate the greatest common divisor between the pole number 2p of the electrical machinery and the total slot number Q.

The minimum slot number in one parallel branch of the electrical machinery Q2=LCM (2y, Q1)=LCM (8, 30)=120, where LCM is a least common multiple calculator, and LCM (2y, Q1) is to calculate the least common multiple of twice the preset pitch y and the minimum electrical-unit slot number Q1.

The maximum parallel branch number in the electrical machinery a=Q÷Q2=360÷120=3. In the present embodiments, the parallel branch number a of the electrical machinery is taken as 3 as an example for illustration.

The method for forming the stator of the electrical machinery further includes mounting the coil of the electrical machinery in the tooth slot, where the coil of the electrical machinery may be the coil of the electrical machinery formed according to a method for forming coils of an electrical machinery according to any one of the implementations of the present application.

Hereinafter, a method for forming coils of an electrical machinery according to an embodiment of the present application will be described. Hereinafter, the coil of the electrical machinery refers to a collection of conductors received in each tooth slot 112 of the iron core 110.

Figure 2:
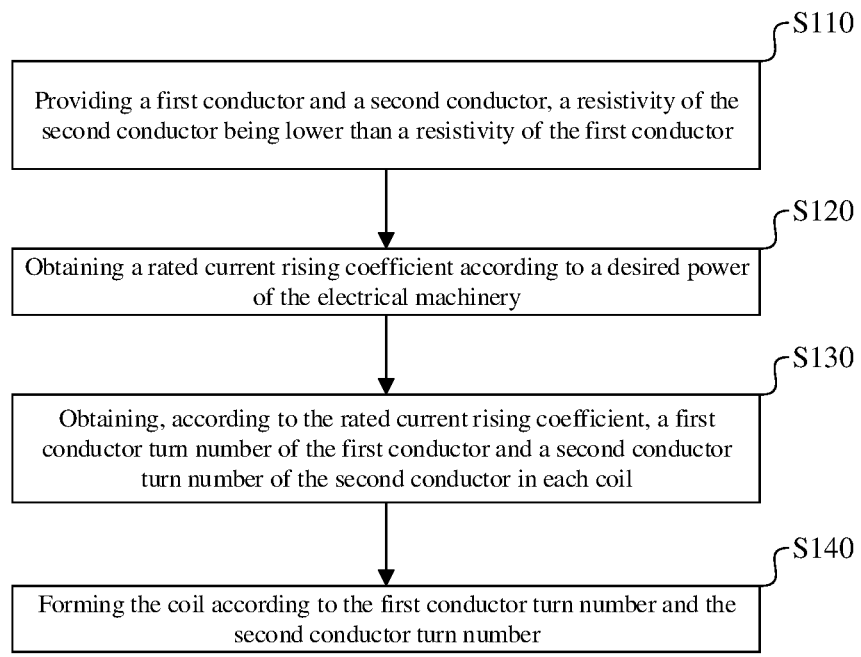
FIG. 2 is a flowchart of a method for forming coils of an electrical machinery according to an embodiment of the present application.

FIG. 2 is a flowchart of a method for forming coils of an electrical machinery according to an embodiment of the present application. The method for forming the coil of the electrical machinery includes steps S110 to S140.

In step S110, a first conductor and a second conductor are provided. A resistivity of the second conductor is lower than a resistivity of the first conductor. Herein, the resistivity of the second conductor being lower than the resistivity of the first conductor means that the resistivity of the second conductor is lower than the resistivity of the first conductor at a same temperature (for example, at normal temperature).

In step S120, a rated current rising coefficient is obtained according to a desired power of the electrical machinery. The rated current rising coefficient is a ratio of a rated current of the electrical machinery with the desired power to a rated current of a reference electrical machinery, where a conductor of coils of the reference electrical machinery includes only the first conductor. The reference electrical machinery has substantially the same structure as the electrical machinery with the desired power except that the conductor of the coil of the reference electrical machinery includes only the first conductor. For example, in the reference electrical machinery, a parallel branch number of the electrical machinery a=3, a total conductor turn number $N_T$ of the coil (that is, a total in-slot conductor turn number of a conductor received in each tooth slot 112 of the iron core 110) is 24, and each of the 24 turns of conductor in each coil is the first conductor.

For example, the first conductor is an aluminum conductor. Since the aluminum conductor has a high resistivity, even if the thickness of a single turn of the aluminum conductor in the coil is large, a large alternating-current resistance coefficient will not be generated. In addition, in some embodiments, the iron core 110 further includes a ventilation channel extending radially through the body 111, so that a heat dissipation area of the iron core 110 is increased and desired heat dissipation capability of the stator is ensured.

In some embodiments, the step S120 of obtaining the rated current rising coefficient according to the desired power of the electrical machinery further includes: establishing a first mapping model of a rated power of the electrical machinery to the rated current rising coefficient; obtaining the rated current rising coefficient according to the desired power of the electrical machinery and the first mapping model. After the type of electrical machinery, the type of stator of the electrical machinery and the type of iron core of the stator are selected according to the desired power of the electrical machinery, a determined first mapping model can be obtained for the selected type of electrical machinery, the selected type of stator of the electrical machinery and the selected type of iron core of the stator. In the first mapping model, rated current rising coefficients have a one-to-one corresponding relationship with desired powers.

In some embodiments, the establishing a first mapping model of a rated power of the electrical machinery to the rated current rising coefficient includes: establishing a second mapping model of the rated power of the electrical machinery to the rated current of the electrical machinery; obtaining the rated current of the reference electrical machinery; and obtaining the first mapping model according to the second mapping model and the rated current of the reference electrical machinery. For the selected type of electrical machinery, the selected type of stator of the electrical machinery and the selected type of iron core of the stator, a determined second mapping model can be obtained. In the second mapping model, rated powers have a one-to-one corresponding relationship with rated currents of the electrical machinery.

In some embodiments, the second mapping model includes:

$$P = mE_0 \times i_q + (X_d - X_q) i_d i_q - i^2 R_1 \quad (1),$$

where in Formula (1), P is the rated power of the electrical machinery, m is a phase number of the electrical machinery, $E_0$ is a no-load back-electromotive force of the electrical machinery, i is the rated current, $i_q$ is a component of the rated current on a quadrature axis of the electrical machinery, $i_d$ is a component of the rated current on a direct axis of the electrical machinery, $X_d$ is a quadrature axis synchronous reactance of the electrical machinery, $X_q$ is a direct axis synchronous reactance of the electrical machinery, and $R_1$ is a stator resistance of the electrical machinery.

Considering that the iron core material of the stator of the electrical machinery is a non-linear ferromagnetic material, as the rated current of the electrical machinery increases, the ampere turns and the magnetomotive force in the stator winding increase in direct proportion to the current. At this time, the iron core will be closer to the saturation section of the magnetization curve (B-H curve) of the iron core material, so that the increasing coefficient of the rated power of the electrical machinery is slightly less than the increasing coefficient of the current.

According to the first mapping model, in embodiments of the present application, for the selected type of electrical machinery, for the selected type of stator of the electrical machinery and for the selected type of iron core of the stator, the total loss of the stator winding can be ensured to be unchanged, and on the premise that the setting value of the weak magnetic voltage of the converter is greater than the voltage at the output side of the electrical machinery, the rated power of the electrical machinery can be considered to be approximately direct proportional to the quadrature axis component of the rated current.

Therefore, for the selected type of electrical machinery, the selected type of stator of the electrical machinery and the selected type of iron core of the stator, a corresponding rated current can be obtained according to the desired power of the electrical machinery. The ratio of the rated current corresponding to each desired power to the rated current of the reference electrical machinery is calculated to obtain a rated current rising coefficient corresponding to each desired power, that is, the first mapping model is obtained.

In step S130, a first conductor turn number of the first conductor and a second conductor turn number of the second conductor in each coil are obtained according to the rated current rising coefficient.

In the present embodiments, the first conductor is, for example, an aluminum conductor. The second conductor may be any conductor having a lower resistivity than the first conductor, such as a copper conductor. For the selected type of electrical machinery, the selected type of stator of the electrical machinery and the selected type of iron core of the stator, when the parallel branch number a of the electrical machinery is unchanged, on the premise that the total loss of the stator winding is ensured to be unchanged, the rated current and the rated power of the electrical machinery can be changed by changing only the first conductor turn number of the first conductor and the second conductor turn number of the second conductor in the coil. In some embodiments, a rated frequency of the electrical machinery is low (for example, when the electrical machinery is used in a direct-drive permanent-magnet wind turbine), and after ignoring the difference in skin effects and eddy current effects between different conductor types (the first conductor and the second conductor), the relationship between the turn number matching scheme of different conductor types and the corresponding rated current rising coefficient is described below.

A conductor turn number parameter is obtained according to the following formula:

$$K = \frac{N_B \times \sqrt{\frac{R_A}{R_B}} + (N_T - N_B)}{N_T}, \quad (2)$$

where in Formula (2), $N_B$ is the second conductor turn number, $N_T$ is the total conductor turn number, K is the rated current rising coefficient, $R_A$ is the resistivity of the first conductor, and $R_B$ is the resistivity of the second conductor. The second conductor turn number $N_B$ is less than or equal to the total conductor turn number $N_T$.

In an example, the total conductor turn number $N_T$ of the coil is 24, and the second conductor turn number $N_B$ ranges from 0 to 24. For example, the resistivity $R_A$ of the first conductor is the resistivity of the aluminum conductor at 20° C. ($2.83 \times 10^{-8}$ Ω-m), and the resistivity $R_B$ of the second conductor is the resistivity of the copper conductor at 20° C. ($1.72 \times 10^{-8}$ Ω-m).

Figure 3:
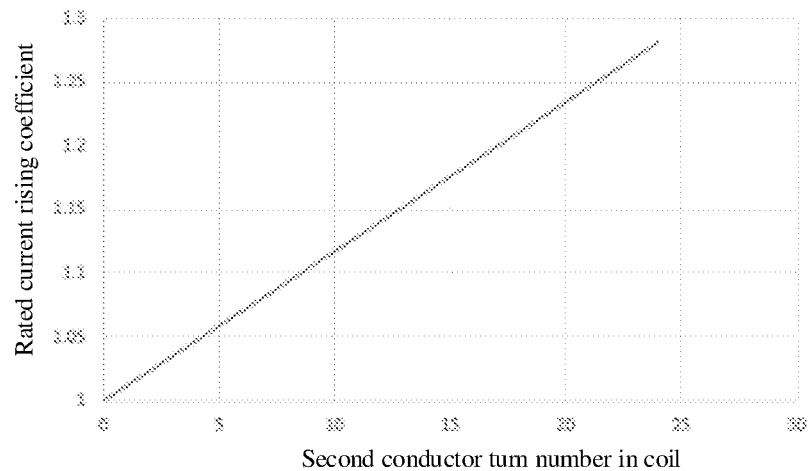
FIG. 3 is a graph of a rated current rising coefficient of an electrical machinery versus a second conductor turn number in each tooth slot in a method for forming a stator of an electrical machinery according to an embodiment of the present application.

According to the parameters in the above examples, the relationship between the rated current rising coefficient of the electrical machinery and the second conductor turn number of the second conductor in the coil is as shown in FIG. 3. With the parameters in the above examples, according to the above-mentioned relationship between the rated power and the rated current of the electrical machinery, only the first conductor turn number of the first conductor and the second conductor turn number of the second conductor in the coil need to be changed, and adjustment of the rated power of the electrical machinery in the range of 1 to 1.25 times the rated power of the reference electrical machinery can be substantially achieved. That is, when the desired power of the electrical machinery is 1 to 1.25 times the rated power of the reference electrical machinery, the same type of stator of the electrical machinery can be used and there is no need to change the size of the stator. Thus, according to different desired powers of the electrical machinery, by adjusting the first conductor turn number of the first conductor and the second conductor turn number of the second conductor in the coil, a general design of the other components of the electrical machinery and the cooling system at different rated powers can be achieved.

In some embodiments, the step S130 of obtaining, according to the rated current rising coefficient, a first conductor turn number of the first conductor and a second conductor turn number of the second conductor in the coil further includes the steps as described below.

First, the conductor turn number parameter is obtained according to the following formula:

$$N_0 = \frac{N_T(K-1)}{\sqrt{\frac{R_A}{R_B}} - 1}, \quad (3)$$

where in Formula (3), $N_0$ is the conductor turn number parameter, $N_T$ is the total conductor turn number, K is the rated current rising coefficient, $R_A$ is the resistivity of the first conductor, and $R_B$ is the resistivity of the second conductor.

Then, the conductor turn number parameter $N_0$ is rounded to obtain the second conductor turn number $N_B$. As for the manner for rounding the conductor turn number parameter $N_0$, the conductor turn number parameter $N_0$ may be rounded up, rounded down, or rounded, and the specific method for rounding may be correspondingly configured according to actual needs.

Then, the second conductor turn number $N_B$ is subtracted from the total conductor turn number $N_T$ to obtain the first conductor turn number $N_A$. At this time, the first conductor turn number $N_A$ of the first conductor and the second conductor turn number $N_B$ of the second conductor in each tooth slot 112 are obtained.

In step S140, coils is formed according to the first conductor turn number and the second conductor turn number.

In some embodiments, the forming the coil according to the first conductor turn number and the second conductor turn number includes: forming first coil units and second coil units. The first coil unit and the second coil unit each include a first conductor ring and/or a second conductor ring with a preset turn number. A material of the first conductor ring is the same as a material of the first conductor, and a material of the second conductor ring is the same as a material of the second conductor. In one of the first coil units and one of the second coil units, a total turn number of the first conductor ring is equal to the first conductor turn number, and the total turn number of the second conductor ring is equal to the second conductor turn number. For example, the total conductor turn number $N_T$ of the coil is 24, then the first coil unit includes the first conductor rings and/or the second conductor rings of 12 turns, and the second coil unit includes the first conductor rings and/or the second conductor rings of 12 turns.

In some embodiments, each of the first coil units includes two connected active sides, and each of the second coil units includes two connected active sides. One of the active sides of one of the first coil units and one of the active sides of one of the second coil units are receivable in a same tooth slot 112 of an iron core 110.

At this time, the coil of the electrical machinery can be obtained. According to the coil of the electrical machinery and the method for forming the coil provided by embodiments of the present application, the rated current rising coefficient is obtained according to the desired power of the electrical machinery. The first conductor turn number of the first conductor and the second conductor turn number of the second conductor in each coil are obtained according to the rated current rising coefficient. Then, the coil is formed according to the first conductor turn number and the second conductor turn number in each coil, thereby obtaining the coil of the electrical machinery satisfying the desired power. By changing the first conductor turn number and the second conductor turn number, different desired powers of the electrical machinery can be achieved, where the adjustment of the rated power of the electrical machinery can be achieved without changing the sizes of the stator and other components of the electrical machinery that are matched to the stator. The cost of redesign of the stator and the large components that are matched to the stator can be saved. The coil and the stator of the electrical machinery with the desired power can be obtained at a lower cost. The economical efficiency for forming the coil, the stator and the electrical machinery can be improved.

As described above, the method for forming the stator of the electrical machinery includes the step of mounting the coil of the electrical machinery in the tooth slot of the iron core. After the coils are mounted in the tooth slots of the iron core, the coils are connected to one another in parallel or in series to obtain the winding.

According to the stator of electrical machinery and the method for forming the stator provided by embodiments of the present application, By changing the first conductor turn number and the second conductor turn number in the coil (that is, each tooth slot 112), different desired powers of the electrical machinery can be achieved, where the adjustment of the rated power of the electrical machinery can be achieved without changing the sizes of the stator and other components of the electrical machinery that are matched to the stator. The cost of redesign of the stator and the large components that are matched to the stator can be saved. The stator of the electrical machinery with the desired power can be obtained at a lower cost. The economical efficiency for forming the stator and the electrical machinery can be improved.

Embodiments of the present application further provide a stator of an electrical machinery. The stator of the electrical machinery can be formed according to the method for forming the stator of the electrical machinery of the foregoing implementations of the present invention.

Figure 4:
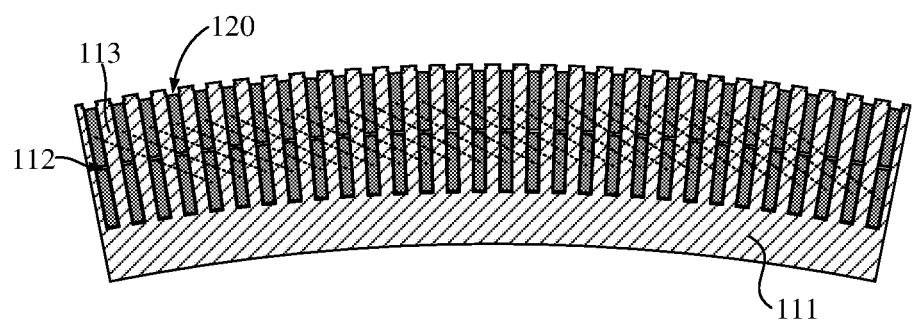
FIG. 4 is a schematic partial cross-sectional view of a stator according to an embodiment of the present disclosure.

FIG. 4 is a schematic partial cross-sectional view of a stator according to an embodiment of the present disclosure. The stator includes an iron core 110 and a winding.

The iron core 110 includes a body 111 having a hollow cylindrical shape and a plurality of tooth slots 112 arranged at intervals along a circumferential direction of the body 111. In the present embodiments, the iron core 110 further includes a plurality of teeth 113 arranged at intervals along the circumferential direction of the body 111. Tooth slots 112 are formed between every adjacent two teeth 113. Optionally, the tooth slots 112 are open slot structures, and each of the tooth slots 112 is a rectangular slot structure.

The winding includes a plurality of coils 120 arranged in the circumferential direction of the iron core 110. The coils 120 may be the coils formed according to the method for forming the coil of the electrical machinery of any one of the implementations of the present application. Each coil 120 is positioned in the tooth slot 112.

The coil 120 includes a plurality of turns of conductor. The plurality of turns of conductor of each coil 120 includes the first conductor and/or the second conductor. The resistivity of the second conductor is lower than the resistivity of the first conductor. The coil 120 of the electrical machinery refers to a collection of conductors received in each tooth slot 112 of the iron core 110.

The total in-slot conductor turn number $N_T$ of the conductor received in each tooth slot 112 of the iron core 110 is a predetermined value, that is, the total conductor turn number $N_T$ of the coil is a predetermined value. When the total in-slot conductor turn number $N_T$ is a predetermined value, a change in the rated power of the electrical machinery can be achieved by adjusting the first conductor turn number of the first conductor and the second conductor turn number of the second conductor in the tooth slot 112. Thus, according to different desired powers of the electrical machinery, by adjusting only the first conductor turn number of the first conductor and the second conductor turn number of the second conductor in the tooth slot 112, a general design of the other components of the electrical machinery and the cooling system at different rated powers can be achieved.

For example, a pole-pair number p of the electrical machinery is 42, and a total slot number Q of the tooth slots 112 of the iron core 110 is 360. A preset pitch y in the above winding is for example 4. A parallel branch number a of the electrical machinery is for example 3. The total in-slot conductor turn number $N_T$ of a conductor received in each tooth slot 112 of the iron core 110 is a predetermined value. In some embodiments, the predetermined value is an even number taken from 20 to 30.

The second conductor has a lower resistivity than the first conductor. The first conductor is for example an aluminum conductor, and the second conductor is for example a copper conductor.

Figure 5:
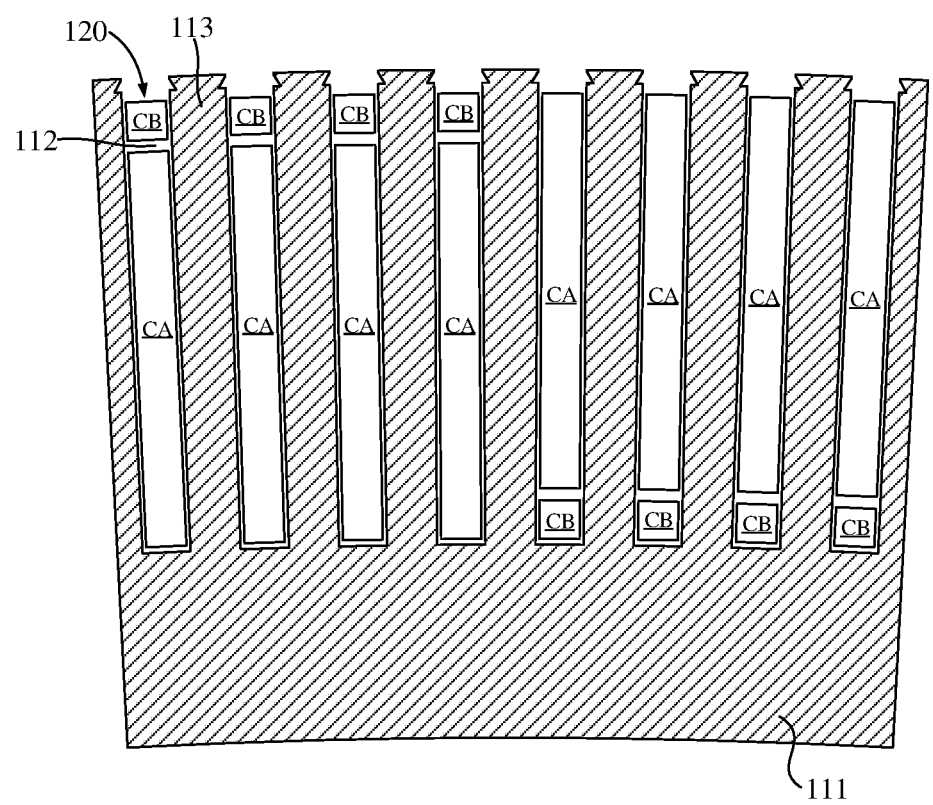
FIG. 5 is a schematic partial cross-sectional view of a stator according to a first embodiment of the present disclosure.
Figure 6:
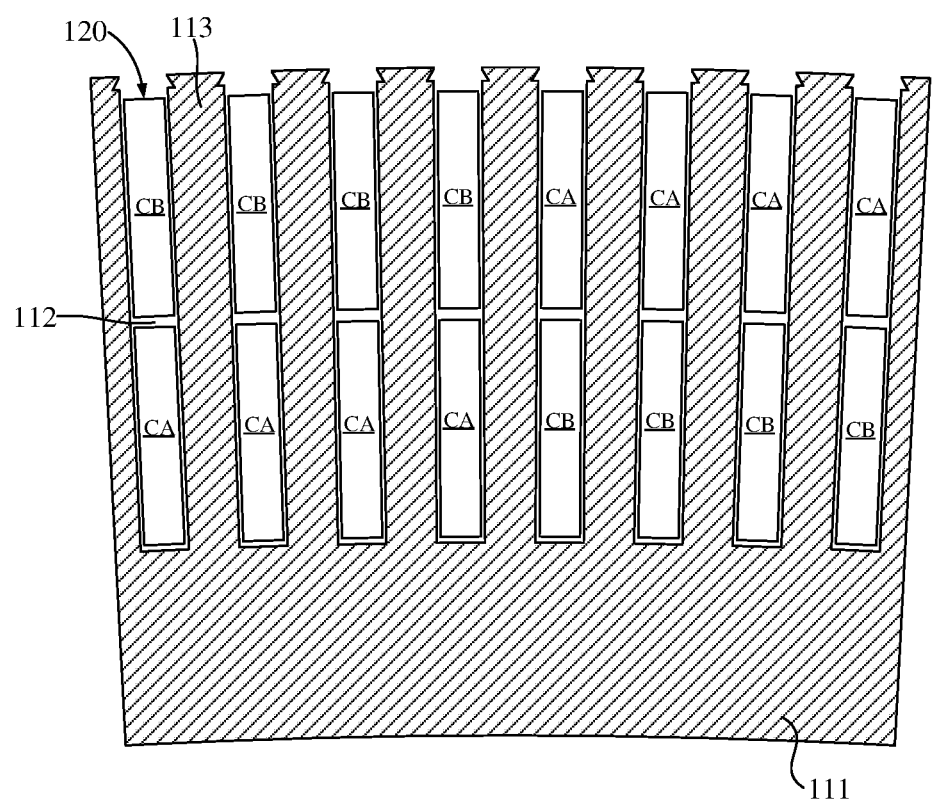
FIG. 6 is a schematic partial cross-sectional view of a stator according to a second embodiment of the present disclosure.
Figure 7:
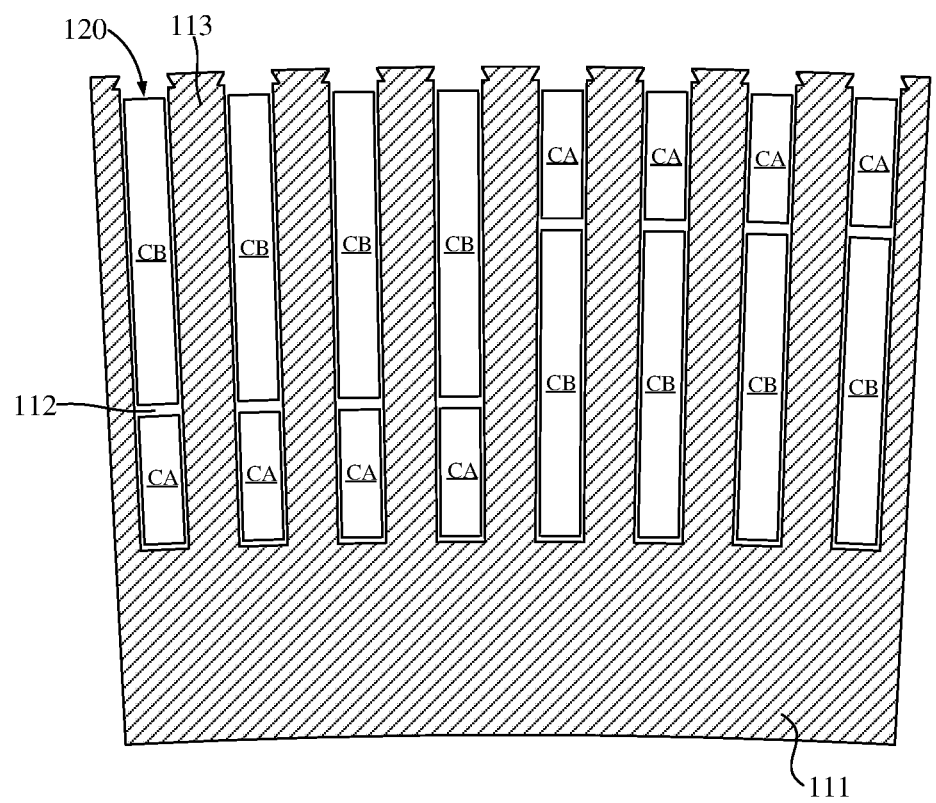
FIG. 7 is a schematic partial cross-sectional view of a stator according to a third embodiment of the present disclosure.

FIG. 5, FIG. 6, and FIG. 7 are schematic partial cross-sectional views of a stator according to a first embodiment, a second embodiment, and a third embodiment of the present application, respectively. In some embodiments, the plurality of turns of conductor received within each tooth slot 112 includes a first conductor CA and a second conductor CB. The second conductor CB has a lower resistivity than the first conductor. By adjusting the proportions of the first conductor CA and the second conductor CB in each tooth slot 112, an adjustment of the rated power of the electrical machinery can be achieved while ensuring the other components of the electrical machinery to be unchanged. The rated power of the electrical machinery including the stator of an embodiment of the present application can be increased to some extent as compared to a reference electrical machinery in which the conductor received in each tooth slot 112 includes only the first conductor CA.

In some embodiments, the total in-slot conductor turn number $N_T$ of a conductor received in each tooth slot 112 of the iron core is a predetermined value. The first conductor turn number of the first conductor in each tooth slot 112 is a positive integer less than the total in-slot conductor turn number $N_T$.

In the second embodiment, the proportions of the first conductor CA and the second conductor CB in each tooth slot 112 are equal, that is, the first conductor turn number of the first conductor CA is equal to the second conductor turn number of the second conductor CB in each tooth slot 112. In the forming process of the stator of the second embodiment, a step of forming the coil according to the first conductor turn number and the second conductor turn number is included. Specifically, the step of forming the coil may include forming a first coil unit and a second coil unit. The turn number of the first coil unit and the turn number of the second coil unit are equal. In the second embodiment, the first coil unit is formed by winding only the first conductor, and the second coil unit is formed by winding only the second conductor. For example, when the total in-slot conductor turn number $N_T$ of a conductor received in each tooth slot 112 is 24, the first coil unit includes 12 turns of the first conductor rings, and the second coil unit includes 12 turns of the second conductor rings. The material of the first conductor ring is the same as the material of the first conductor, and the material of the second conductor turn is the same as the material of the second conductor. At this time, the rated power of the electrical machinery including the stator of the second embodiment is increased by 14% as compared with the reference electrical machinery in which the conductor received in each tooth slot 112 includes only the first conductor CA.

In the first embodiment, the second conductor turn number of the second conductor CB in each tooth slot 112 is less than the first conductor turn number of the first conductor CA. In the forming process of the stator of the first embodiment, a step of forming the coil according to the first conductor turn number and the second conductor turn number in each tooth slot is included. Specifically, the step of forming the coil may include forming the first coil unit and the second coil unit. In the first embodiment, the first coil unit is wound by only the first conductor, and the second coil unit are wound by both the first conductor and the second conductor. For example, when the total in-slot conductor turn number $N_T$ of a conductor received in each tooth slot 112 is 24, the first coil unit includes 12 turns of the first conductor rings, and the second coil unit includes 10 turns of the first conductor rings and 2 turns of the second conductor rings. At this time, the rated power of the electrical machinery including the stator of the first embodiment is increased by 1.17% to 12.9% as compared with the reference electrical machinery in which the conductor received in each tooth slot 112 includes only the first conductor CA.

In the third embodiment, in each tooth slot 112, the second conductor turn number of the second conductor CB is greater than the first conductor turn number of the first conductor CA. In the forming process of the stator of the third embodiment, a step of forming the coil according to the first conductor turn number and the second conductor turn number in each tooth slot is included. Specifically, the step of forming the coil may include forming the first coil unit and the second coil unit. In the third embodiment, the first coil unit is wound by only the second conductor, and the second coil unit is wound by both the first conductor and the second conductor. For example, when the total in-slot conductor turn number $N_T$ of a conductor received in each tooth slot 112 is 24, the first coil unit includes 12 turns of the second conductor rings and the second coil unit includes 7 turns of the first conductor rings and 5 turns of the second conductor rings. At this time, the rated power of the electrical machinery including the stator of the third embodiment is increased by 15.2% to 26.9% as compared with the reference electrical machinery in which the conductor received in each tooth slot 112 includes only the first conductor CA.

In the first embodiment and the third embodiment described above, each coil 120 includes both the first conductor and the second conductor, and the first conductor turn number is different from the second conductor turn number in each coil 120, so that the coil 120 formed by stacking a plurality of conductors is an asymmetric structure, that is, the stacked structure of the first conductor and the stacked structure of the second conductor are arranged asymmetrically in the coil 120. Since the materials of the first conductor and the second conductor are different, and the thermal expansion coefficients thereof are different, the volume of the first conductor and the volume of the second conductor change to different degrees in the operation of the electrical machinery. Further, since the stacked structure of the first conductor and the stacked structure of the second conductor are asymmetrically arranged, the outer surface of the coil 120 in the operation state of the electrical machinery is more irregular, the connection stability between the coil 120 and the tooth slot 112 is improved, and the possibility of the coil 120 falling off is significantly reduced.

The forming process of the stator includes the step of mounting the coil in the tooth slot of the iron core. Specifically, the first coil units and the second coil units may be mounted in the tooth slots 112 in a predetermined periodically repeating arrangement along the circumferential direction of the body 111, where each tooth slot 112 receives therein one active side of one first coil unit and one active side of one second coil unit. After the coils are mounted in the tooth slots of the iron core, the coils are connected to one another in parallel or in series to obtain the winding.

In the stator formed according to the method for forming the stator of the electrical machinery of the foregoing embodiments of the present application, the plurality of turns of the conductor received in each tooth slot 112 is not limited to including both the first conductor CA and the second conductor CB.

Figure 8:
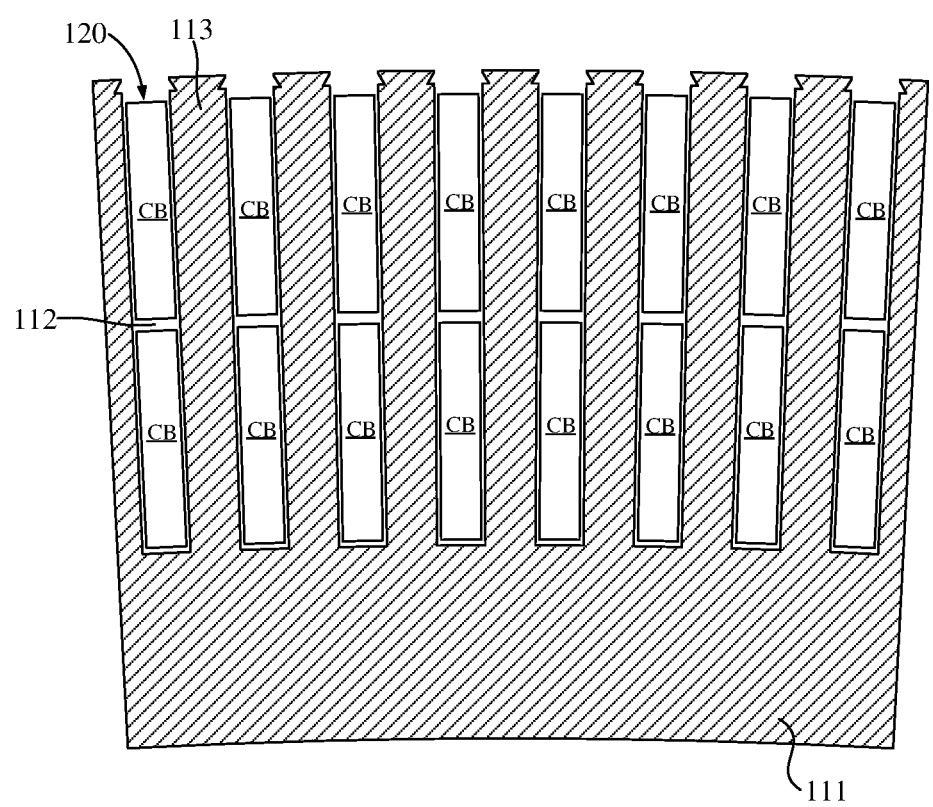
FIG. 8 is a schematic partial cross-sectional view of a stator according to a fourth embodiment of the present disclosure.

FIG. 8 is a schematic partial cross-sectional view of a stator according to a fourth embodiment of the present application. In the fourth embodiment, the plurality of turns of conductor received in each tooth slot 112 is the second conductor CB. In the fourth embodiment, each coil 120 is wound by only the second conductor CB. At this time, the rated power of the electrical machinery including the stator of the fourth embodiment is increased by 28% as compared with the reference electrical machinery in which the conductor received in each tooth slot 112 includes only the first conductor CA.

In addition, in some embodiments, the iron core 110 further includes a ventilation channel (not shown) radially extending through the body 111, so that a heat dissipation area of the iron core 110 is increased and a desired heat dissipation capability of the stator is ensured. In an embodiment, the cooling of the electrical machinery including the stator may be configured as forced air cooling.

According to the stator of the electrical machinery of an embodiment of the present application, each tooth slot 112 receives two types of conductors with different resistivities. By adjusting the first conductor turn number of the first conductor and the second conductor turn number of the second conductor CB in each coil 112, the adjustment of the rated power of the electrical machinery including the stator can be achieved, and the expandability of the power of the electrical machinery can be improved without changing the size of the stator.

The stator of the above embodiments of the present application is used in an electrical machinery, where the electrical machinery may be a motor or a generator. Embodiments of the present application further provide a generator including the stator of the generator according to any one of the foregoing implementations of the present application. The generator is for example a generator in a wind turbine.

Figure 9:
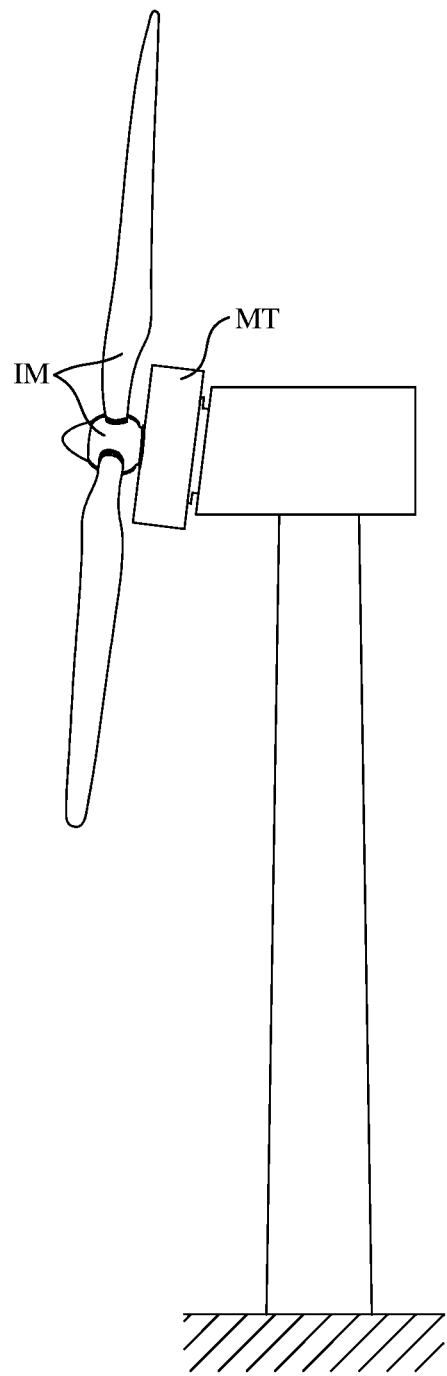
FIG. 9 is a schematic perspective view of a wind turbine according to an embodiment of the present disclosure.

FIG. 9 is a schematic perspective view of a wind turbine according to an embodiment of the present application. The wind turbine includes a generator MT and an impeller IM coupled to a rotating component of the generator. The generator MT may include a stator and a rotor coaxially connected to the stator. The rotor is able to rotate with respect to the stator. The rotor is coaxially connected to the impeller IM and is able to rotate with the impeller IM when the impeller IM rotates.

In some embodiments, at least a part of the structure of the rotor surrounds the outer circumferential side of the stator, that is, the generator MT is an outer rotor-inner-stator electrical machinery. The stator includes an iron core and a winding. The iron core includes a body having a hollow cylindrical shape and a plurality of tooth slots arranged at intervals along a circumferential direction of the body. The winding includes a plurality of coils arranged along a circumferential direction of the iron core. Each coil is in the tooth slot. The rotor includes a yoke that surrounds an outer circumferential side of the stator, and a plurality of permanent magnets are arranged on an inner circumferential surface of the yoke (the circumferential surface facing the stator). As the rotor rotates with the impeller IM, the winding cuts magnetic lines of force, thereby inducing an electrical potential. In the above embodiments, the generator MT is an outer rotor-inner stator electrical machinery, and in other embodiments, the generator MT may be an inner rotor-outer stator electrical machinery.

Each coil includes a plurality of turns of conductor. The conductor may include a first conductor and a second conductor. A resistivity of the second conductor is lower than a resistivity of the first conductor. By adjusting the proportions of the first conductor and the second conductor in the coil, adjustment of the rated power of the generator MT can be achieved while the other components of the generator MT are ensured to be unchanged. When there is a demand for power variation in the wind driven generator system, adjustment of the corresponding rated power can be achieved without changing the sizes of the stator and other components of the generator MT that are matched to the stator. The economical efficiency for forming the stator and the generator MT can be improved.

The embodiments of the present application as described above do not exhaustively describe all the details, and the present application is not limited to the specific embodiments described above. Obviously, many modifications and variations are possible in light of the above description.

These embodiments are specifically described in this specification to better explain principles and practical usage of the present application, so that those skilled in the art can make good use of the present application and make modifications based on the present application. This application is limited only by the claims, along with their full scope and equivalents.

What is claimed is:

1. A method for forming coils of an electrical machinery, comprising:
   providing a first conductor and a second conductor, a resistivity of the second conductor being lower than a resistivity of the first conductor;
   obtaining a rated current rising coefficient according to a desired power of the electrical machinery, the rated current rising coefficient being a ratio of a rated current of the electrical machinery with the desired power to a rated current of a reference electrical machinery, wherein a conductor of coils of the reference electrical machinery comprises only the first conductor;
   obtaining, according to the rated current rising coefficient, a first conductor turn number of the first conductor and a second conductor turn number of the second conductor in each coil;
   forming the coil according to the first conductor turn number and the second conductor turn number.

2. The method according to claim 1, wherein a total conductor turn number of the coil is a predetermined value.

3. The method according to claim 2, wherein the obtaining, according to the rated current rising coefficient, a first conductor turn number of the first conductor and a second conductor turn number of the second conductor in the coil comprises:
   obtaining a conductor turn number parameter according to the following formula:

$$N_0 = \frac{N_T(K-1)}{\sqrt{\frac{R_A}{R_B}} - 1},$$

wherein $N_0$ is the conductor turn number parameter, $N_T$ is the total conductor turn number, $K$ is the rated current rising coefficient, $R_A$ is the resistivity of the first conductor, and $R_B$ is the resistivity of the second conductor;
   rounding the conductor turn number parameter to obtain the second conductor turn number; and
   subtracting the second conductor turn number from the total conductor turn number to obtain the first conductor turn number.

4. The method according to claim 2, wherein the predetermined value is an even number taken from 20 to 30.

5. The method according to claim 1, wherein the obtaining a rated current rising coefficient according to a desired power of the electrical machinery comprises:
   establishing a first mapping model of a rated power of the electrical machinery to the rated current rising coefficient;
   obtaining the rated current rising coefficient according to the desired power of the electrical machinery and the first mapping model.

6. The method according to claim 5, wherein the establishing a first mapping model of a rated power of the electrical machinery to the rated current rising coefficient comprises:

establishing a second mapping model of the rated power of the electrical machinery to the rated current of the electrical machinery;

obtaining the rated current of the reference electrical machinery;

obtaining the first mapping model according to the second mapping model and the rated current of the reference electrical machinery.

7. The method according to claim 6, wherein the second mapping model includes:

$$P=mE_0 \times i_q+(X_d-X_q)i_d i_q-i^2 R_1,$$

wherein P is the rated power of the electrical machinery, m is a phase number of the electrical machinery, $E_0$ is a no-load back-electromotive force of the electrical machinery, i is the rated current, $i_q$ is a component of the rated current on a quadrature axis of the electrical machinery, $i_d$ is a component of the rated current on a direct axis of the electrical machinery, $X_d$ is a quadrature axis synchronous reactance of the electrical machinery, $X_q$ is a direct axis synchronous reactance of the electrical machinery, and $R_1$ is a stator resistance of the electrical machinery.

8. The method according to claim 1, wherein the first conductor is an aluminum conductor and the second conductor is a copper conductor.

9. The method according to claim 1, wherein the forming the coil according to the first conductor turn number and the second conductor turn number comprises:

forming first coil units and second coil units, wherein the first coil unit and the second coil unit each comprise a first conductor ring and/or a second conductor ring with a preset turn number, a material of the first conductor ring is the same as a material of the first conductor, and a material of the second conductor ring is the same as a material of the second conductor-ring, wherein in one of the first coil units and one of the second coil units, a total turn number of the first conductor ring is equal to the first conductor turn number, and a total turn number of the second conductor ring is equal to the second conductor turn number.

10. The method according to claim 9, wherein each of the first coil units comprises two connected active sides, and each of the second coil units comprises two connected active sides, one of the active sides of one of the first coil units and one of the active sides of one of the second coil units are receivable in a same tooth slot of an iron core.

11. Coils of an electrical machinery, the coil being formed according to the method according to claim 1.

12. A method for forming a stator of an electrical machinery, comprising:

providing an iron core of the stator, the iron core comprising a plurality of tooth slots each for receiving coils;

mounting the coil according to claim 11 in the tooth slot.

13. A stator of an electrical machinery, comprising:

an iron core comprising a body having a hollow cylindrical shape and a plurality of tooth slots arranged at intervals along a circumferential direction of the body; and a winding comprising a plurality of the coils according to claim 11 arranged in a circumferential direction of the iron core, each of the coils being positioned in a corresponding tooth slot of the plurality of tooth slots.

14. The stator according to claim 13, wherein a total in-slot conductor turn number of a conductor received in each of the tooth slots of the iron core is a predetermined value, and the first conductor turn number of the first conductor in each of the tooth slots is a positive integer less than the total in-slot conductor turn number.

15. The stator according to claim 13, wherein the iron core further comprises a ventilation channel extending radially through the body.

16. An electrical machinery comprising the stator according to claim 13.

* * * * *